United States Patent
Zierhut

[11] Patent Number: 5,546,419
[45] Date of Patent: Aug. 13, 1996

[54] BUS COUPLER

[75] Inventor: Hermann Zierhut, Munich, Germany

[73] Assignee: Siemens Aktiengesellschuft, Munich, Germany

[21] Appl. No.: 94,064

[22] PCT Filed: Dec. 5, 1991

[86] PCT No.: PCT/EP91/02331

§ 371 Date: Jul. 28, 1993

§ 102(e) Date: Jul. 28, 1993

[87] PCT Pub. No.: WO92/13411

PCT Pub. Date: Aug. 6, 1992

[30] Foreign Application Priority Data

Jan. 29, 1991 [EP] European Pat. Off. .............. 91101162

[51] Int. Cl.⁶ ..................... H04B 3/00; H04L 25/00
[52] U.S. Cl. ..................... 375/257; 375/258; 375/319
[58] Field of Search ..................... 375/7, 36, 76, 375/3, 211, 214, 257, 258, 316–319; 307/231, 350, 355, 356, 358; 327/50, 51, 61, 65, 84, 86

[56] References Cited

U.S. PATENT DOCUMENTS

| | | | |
|---|---|---|---|
| 3,638,183 | 1/1972 | Prögler et al. | 375/76 |
| 4,646,319 | 2/1987 | Engel et al. | 375/76 |
| 4,697,275 | 9/1987 | Lane | 375/76 |
| 5,091,920 | 2/1992 | Ikeda et al. | 375/76 |
| 5,142,554 | 8/1992 | Stribling et al. | 375/36 |

Primary Examiner—Stephen Chin
Assistant Examiner—Don Vo
Attorney, Agent, or Firm—Kenyon & Kenyon

[57] ABSTRACT

Bus coupler operates with a transformer and a comparator which is connected downstream in the signal-processing branch. The comparator threshold is raised as a function of the signal in the case of larger signals relative to small signals.

6 Claims, 5 Drawing Sheets

BUS COUPLER

BACKGROUND OF THE INVENTION

The present invention relates to a bus coupler which operates with a transformer and with a comparator that is connected downstream in a signal-processing branch.

Such a bus coupler is disclosed (FR-A-2,443,770, FIG. 1). The bus coupler of the comparator operates there with a statically set threshold. This data bus system operates with a terminating impedance at the end of each bus line.

In the case of data bus systems, it is known to pass both data and information signals together with a supply voltage on a bus conductor. Such a system is disclosed in EP-A-0, 365,696. In this case, the bus conductor is supplied from a voltage supply having a DC voltage which is balanced with respect to ground. A plurality of subscribers can be connected to the bus conductor. Those subscribers can pick off both the supply voltage and an information signal. Information signals can also be transmitted to the bus by the subscribers. A transformer with a capacitor is used for separating received information signals or for emitting information signals to the bus. In the case of such an inductive bus coupler, the capacitor separates the potentials of the energy supply for the on-board network and closes the signal path through the transformer winding on the bus side. The system operates without any terminating impedance at the end of the bus line.

For transmission of bit pulses, the inductance L of the coupler should be as large as possible, since the load of a transmitter which operates on the bus comprises a very large number of parallel-connected stations, each with their own bus coupler. At the same time, the total load impedance should be as low as possible, so that the magnetization current surge is not too large. If a comparator is used in the signal-processing branch of a bus coupler, relatively powerful signals, such as those from transmitters operating close to the bus, should, on the other hand, be received and even powerful interference signals should be attenuated or suppressed.

SUMMARY OF THE INVENTION

The present invention provides a bus coupler which attenuates relatively powerful signals more severely than weak signals.

A bus coupler according to the present invention has a comparator connected downstream in the signal processing branch. The comparator threshold is raised as a function of the signal in the case of large signals relative to small signals. A capacitor which is connected in series with and upstream of the comparator input and a resistance branch which is in parallel with the capacitor are suitable for this purpose, for example. In the case of a positive signal which is received at the capacitor, on its other side, a correspondingly negative signal is supplied to the comparator input, so that only a comparatively large positive pulse could reproduce the old signal state at the output of the comparator. In other words, the threshold value of the comparator is raised, as a result of which a greater attenuation effect is achieved for powerful pulses.

The present invention also promotes the demagnetization of the transformer by compensating pulses, as is known per se from EP-A-0,379,902, but in this case ensures that the demagnetization can take place in a manner which is attenuated as little as possible. In this instance the bus coupler may include a resistance branch that is partially bridged by a valve. The valve is designed to have an open path for a working pulse. The path is interrupted for a compensating pulse. The valve may have a response voltage such that the valve is blocked for small signals. Of course, the valve could be replaced with multiple valves. In consequence, contradictory requirements are satisfied.

According to this, as initially stated, the inductance of the transformer is kept large and, on the other hand, the resistance in the resistance branch is kept small. Furthermore, the demagnetization during the output signal following the information signal, in order to demagnetize the transformer, is provided by an inductance which is reduced by the capacitance, with an increased resistance in the resistance branch. This increased resistance is obtained by means of the blocked valve path with the resistance which is not yet bridged.

Nevertheless, furthermore, as already indicated, a large input signal is attenuated when viewed from the output of the comparator, so that the excessive signals from close transmitters can be reduced to desirable levels and interference signals, especially as a consequence of compensating pulses for demagnetization of the transformer, are attenuated.

The time constant $\tau$, as a product of the resistance and capacitance, is correspondingly larger for the compensating pulse than for the bit sequence of an information signal, so that the compensating oscillations are correspondingly less attenuated. In a further embodiment the resistance branch of the coupler includes at least two resistors and each resistor is bridged by a valve having its own predetermined threshold in the forward direction and that threshold value increases along the now direction of the resistors. In the case of such a bus coupler an increasingly severe reduction is obtained for increasingly strong signals by correspondingly raising the threshold value of the comparator. Logarithmic characteristics can in particular thus also be achieved.

It is also possible to provide that at least two branch resistors, where one resistor is in the range of 2:1 to 4:1. Also, the discharge time constant can be selected to be in the range of 10 to 20 times the time constant of one bit of the signal processing branch.

If either modification is selected, particularly favorable conditions are achieved in practice.

BRIEF DESCRIPTION OF THE DRAWINGS

The present invention will now be explained in more detail with reference to exemplary embodiments which are reproduced schematically in the drawing:

In FIG. 1, a bus coupler 3 is inductively connected to a bus 1, that includes the conductors 2, by means of a transformer 4. The bus conductors 2 carry DC voltage for the on-board power supply from bus couplers and AC voltage for signal processing. The DC voltage for the on-board network of the bus coupler 3 is picked off via on-board network lines 5. A coupling capacitor 6 closes a through path for AC voltage signals for signal processing, between the two primary windings of the transformer 4. A comparator 8 is connected to the secondary winding 7 of the transformer 4. According to FIG. 1, a circuit arrangement 9 is arranged upstream of its input side. The output side 10 of the comparator 8 supplies the conditioned signals of the signal-processing branch on for further evaluation. According to the present invention, the comparator 8 is operated such that its comparator threshold is raised as a function of the signal, in the case of larger signals, relative to smaller signals. A suitably dimensioned capacitor 11 in the circuit arrangement 9 is suitable for this purpose, which circuit arrangement 9 can in general be understood as a four-pole network, the capacitor 11 being connected in series with and upstream of the comparator input.

Figure 1:
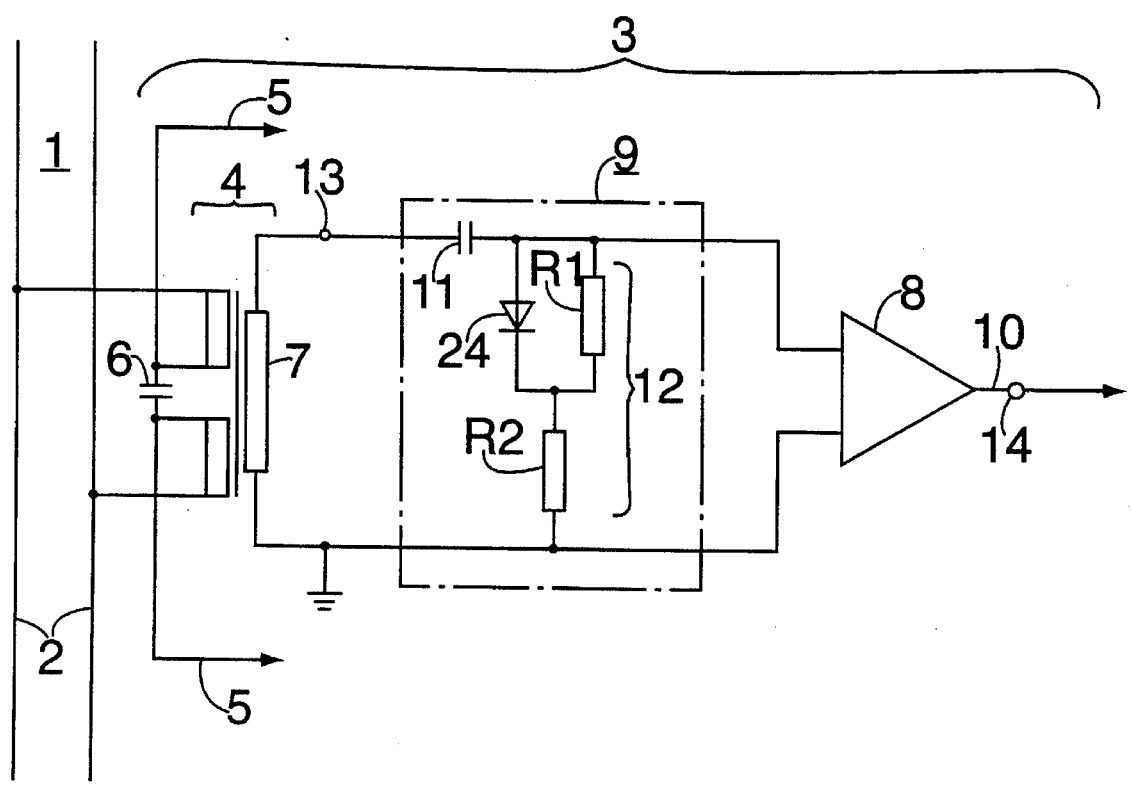
FIG. 1 shows a bus coupler.

In order to operate advantageously with compensating pulses for demagnetizing the transformer, in the exemplary embodiment according to FIG. 1, a resistance branch 12 in the circuit arrangement 9 is furthermore connected upstream, in parallel with the input of the comparator 8. Such a resistance branch also assists the discharging of the capacitor 11.

Figure 2:
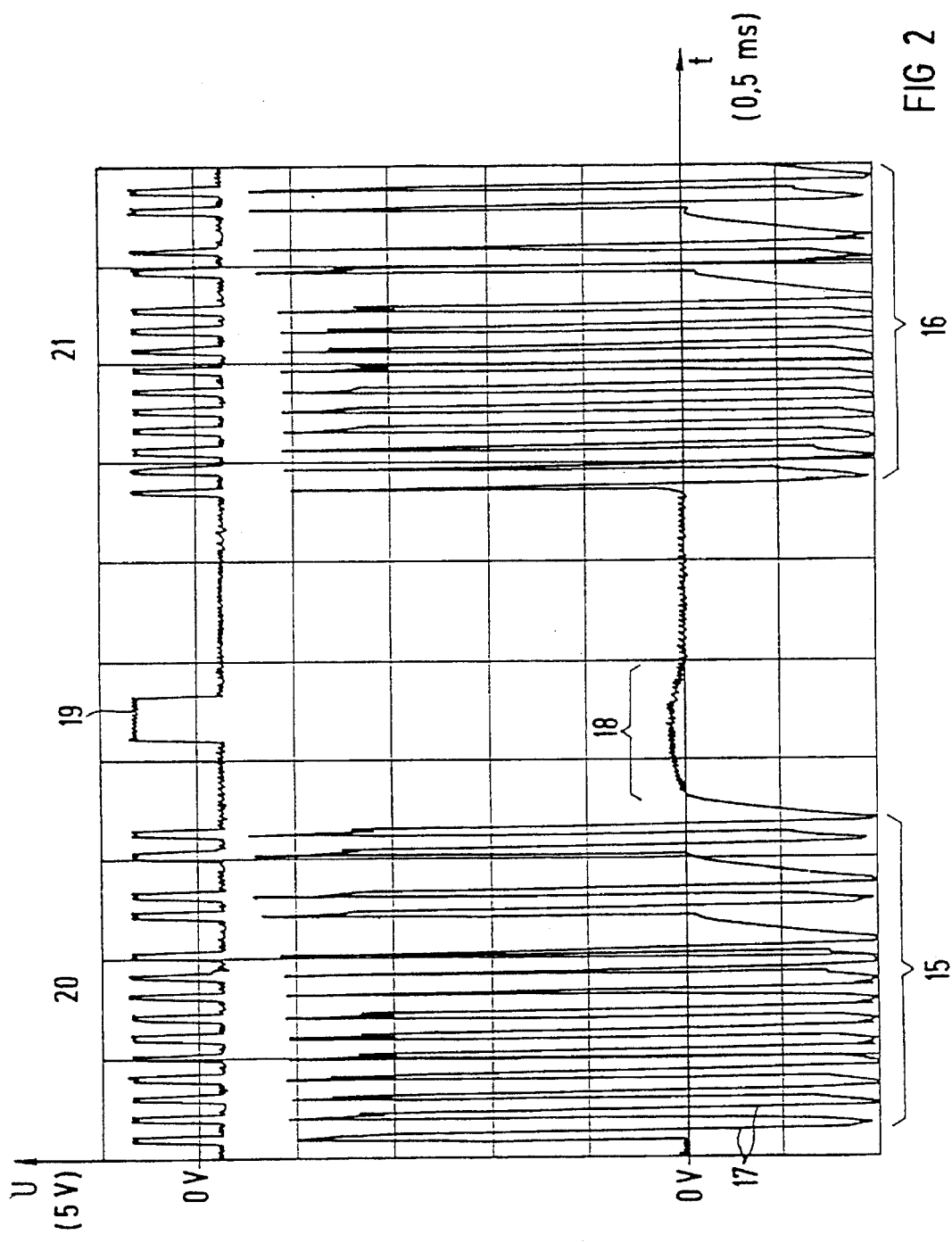
FIG. 2 shows a diagram of the voltage with respect to time for a transformer and operational amplifier without the measures according to the invention, the lower curve showing the conditions after the transformer and the upper curve the response at the output of the comparator.

The lower curve in the diagram according to FIG. 2 can be measured at the measurement point 13, downstream of the transformer. It is determined that an induction voltage 18 occurs between two information values 15 and 16 from sequences of individual bits 17. The induction voltage 18 is reduced to compensating pulses as a result of the demagnetization processes in the transformer 4 and is amplified, in particular by charge reversals on the coupling capacitor 6. In the absence of the circuit arrangement 9 and without any special control of the comparator 8, with a voltage response according to the lower curve in FIG. 2, a voltage response according to the upper curve according to FIG. 2 is then produced at the measurement point 14 at the output of the comparator 8, according to FIG. 1, without the circuit arrangement 9. Without special precautions, the induction voltage 18 is then amplified to form a false pulse 19 which is in the order of magnitude of the information signals or information values 20 and 21.

In the diagram according to FIG. 2, the abscissa shows time t in units of 0.5 ms, and the ordinate shows the voltage U in units of 5 V.

Figure 3:
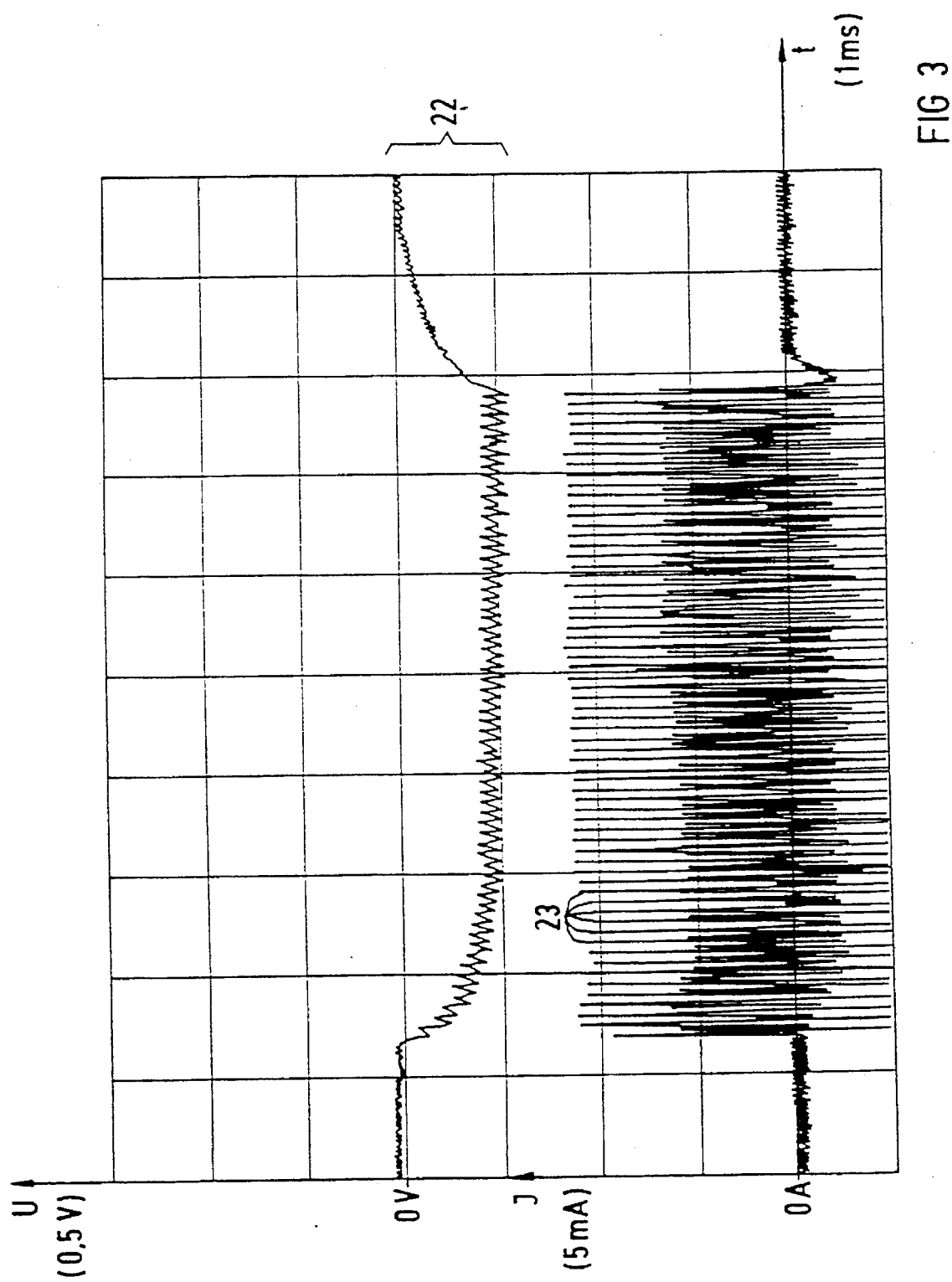
FIG. 3 shows a diagram of the voltage and of the current with respect to time for the signal-processing branch with the measures according to the invention, the upper curve showing a voltage for driving the comparator and the lower curve showing the current for a long information word at the output of the comparator.

FIG. 3 shows control according to an embodiment of the present invention in which the comparator threshold is controlled as a function of the signal. The abscissa shows time in units of 1 ms, and the ordinate the voltage U in units of 0.5 V. The upper curve shows the response of the voltage 22 at the control capacitor 11. The lower curve shows the corresponding current response in units of 5 mA. A long word having a sequence of individual bits 23 is shown. The voltage 22 shows the extent of displacement of the comparator threshold. Relatively high signals are thus amplified more weakly by the comparator, and relatively weak signals are amplified without interference.

Figure 4:
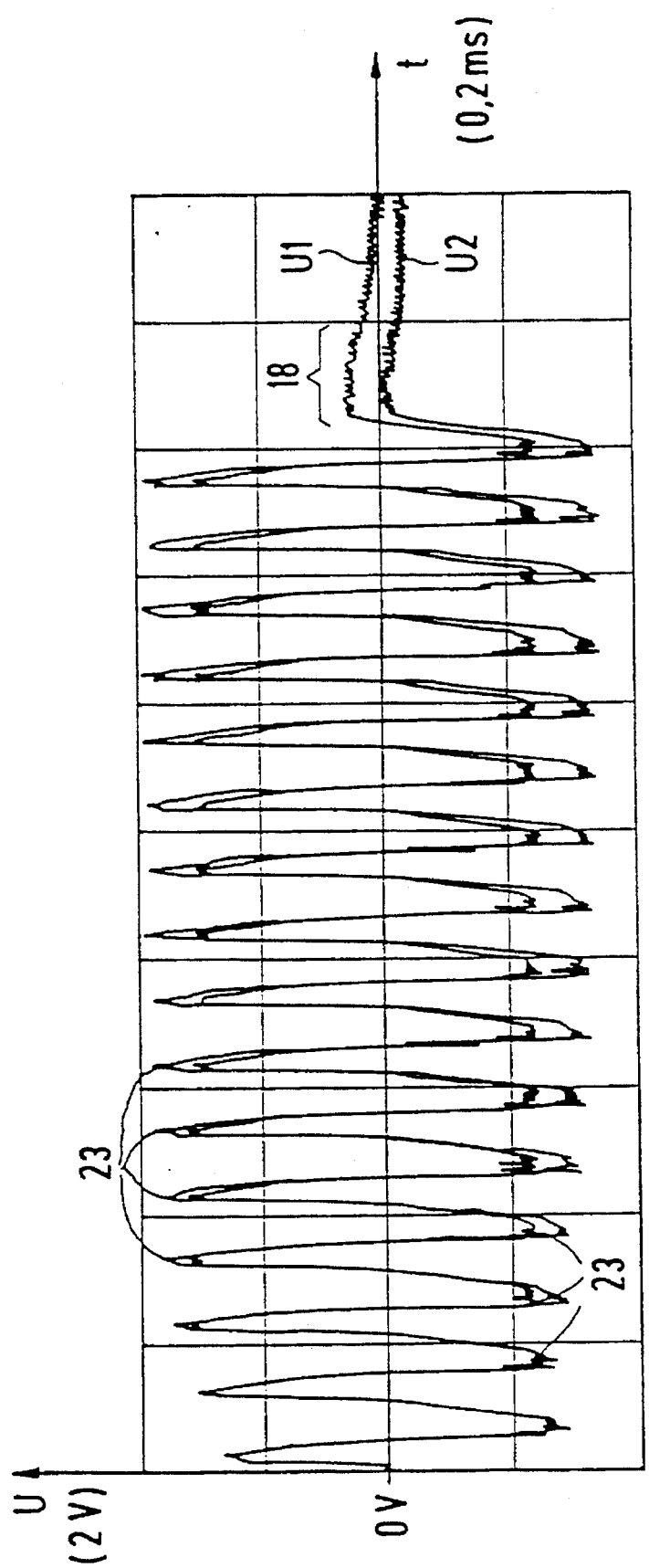
FIG. 4 shows a diagram of the voltage with respect to time in the signal-processing branch with the comparator being controlled according to the present invention

In the diagram according to FIG. 4, the voltage U1 is shown at the measurement point 13 of the signal-processing branch according to FIG. 1, and U2 between the circuit arrangement 9, which is arranged upstream of the comparator 8, and the comparator. The circuit arrangement 9 has a capacitor 11, which is connected in series with and upstream of the input of the comparator 8, and a parallel resistance branch 12, the resistance branch being partially bridged by a valve 24 or by a plurality of valves. The valve has a polarity such that it is open for the working pulse of the valve path and is interrupted for the compensating pulse. The compensating pulses for demagnetizing the converter coils of the transformer 4 are in this case conveyed deliberately, but their signal effect downstream of the comparator is attenuated or switched off. Since the voltage U2 downstream of the circuit arrangement 9 or of the four-pole network does not exceed the zero line, there is no longer any signal downstream of the comparator to the compensating pulses 18 in the voltage U1 in the voltage U2. Before the induction voltage 18, the voltages U1 and U2 show a sequence of individual bits 23, which are part of a complete information word.

The circuit arrangement 9 according to FIG. 1 is designed in the exemplary embodiment shown such that the resistance branch 12 is bridged with respect to R1 by a valve 24 of such polarity that the valve path is open for the working pulse and is interrupted for the compensating pulse. For the working pulse, the time constant τ is then the product of the capacitance of the control capacitor 11 and the resistor R2. For the compensating pulse, the time constant τ is then the product of the capacitance of the control capacitor C1 and the sum of the resistors R1 and R2. The large time constant for the compensating pulse corresponds to low attenuation, and the small time constant for the operating pulse to a correspondingly large attenuation. The compensating pulses are thus given a long time duration, but their influence on signal formation downstream of the comparator is suppressed or switched off. If the valve 24 has a response voltage such that the valve is blocked for signals which are defined as small, such small signals are not attenuated much.

Figure 5:
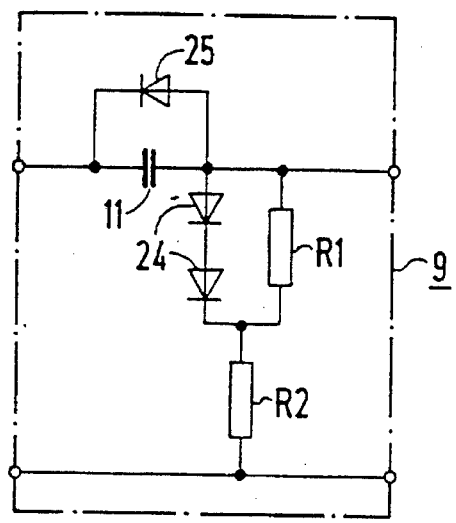
FIG. 5 shows an exemplary embodiment for the circuit group, which is arranged upstream of the comparator, between said comparator and the converter.
Figure 6:
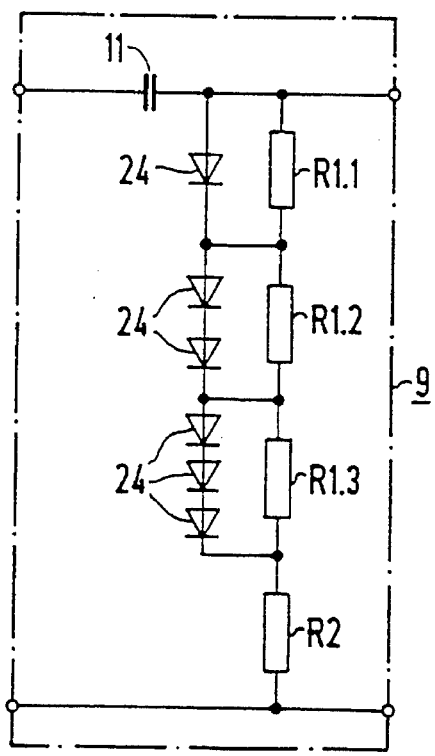
FIG. 6 shows a further exemplary embodiment for the circuit group according to FIG. 5.

In the exemplary embodiment of the circuit arrangement 9 according to FIG. 5, the control capacitor 11 is provided with a limiting diode 25 in the path of the working pulse, which limiting diode 25 limits the control of the regulation shift of the comparator 8 in a defined manner. In the exemplary embodiment according to FIG. 5, the resistor R1 is bridged by two valves 24, irrespective of the limiting diode, so that, in the case of valves which are identical to that in FIG. 1, double the response voltage is achieved is reached. The resistor R1 is then not bridged until this higher voltage is reached. In the case of the exemplary embodiment according to FIG. 6, the resistors R1.1, R1.2 and R1.3 are bridged by an increasing number of valves 24. R1.1 by a valve 24, R1.2 by two valves 24 and R1.3 by three valves 24. Corresponding components with the correspondingly higher response voltage can, of course, also be used instead of a plurality of valves. If two or more resistors are bridged, said resistors are then in each case bridged by valves having a predetermined threshold voltage in the forward direction, which voltage rises in the ascending row direction, so that logarithmic or other desired regulation curves can be obtained.

For a simple exemplary embodiment of the circuit arrangement 9 according to FIG. 1, advantageous value ranges for optimizing the conveyance of compensating processes for demagnetization and for suppression of interference signals and of neighboring powerful transmitting signals, the following value ranges are favorable:

the ratio of the resistors R2:R1 may be in the range from 1:2 to 1:4.

The discharge time constant C11×(R1+R2) may be on the order of 10 to 20 times the time constant of one bit of the signal-processing branch.

I claim:

1. A bus coupler comprising:

an input circuit with an input for coupling to a signal-carrying bus; and a comparator with inputs coupled across an output of the input circuit, wherein:

the input circuit attenuates a signal at its input as a function of the signal's amplitude so that the attenuation increases as the signal's amplitude increases; and the input circuit includes:

a resistance branch coupled across the inputs of the comparator, the resistance branch being partially bridged by a valve, the valve conducting for an input signal with an amplitude at least as large as a predetermined threshold and the valve being blocked for an input signal with an amplitude less than the predetermined threshold, and a control capacitor coupled between the input of the input circuit and one of the inputs of the comparator.

2. The bus coupler of claim 1, wherein:

the valve conducts when a signal pulse is applied to the bus coupler and is blocked when a compensating pulse is applied; and the signal pulses are used to convey information and the compensating pulses are used to demagnetize a transformer by which the bus coupler is coupled to the bus.

3. The bus coupler of claim 2, wherein the resistance branch includes at least two resistors that are each bridged by valves having a predetermined threshold voltage in the conducting direction, the valves having progressively increasing threshold voltages.

4. The bus coupler of claim 2, wherein the resistance branch includes a bridged resistor and an unbridged resistor, the resistance of the bridged resistor being two to four times the resistance of the unbridged resistor.

5. The bus coupler of claim 3, wherein a time constant of a discharge of the control capacitor through the resistors of the resistance branch is on an order of magnitude of 10 to 20 times a period of one bit of the signal pulses.

6. The bus coupler of claim 1, wherein the control capacitor is bridged by a limiting diode.

* * * * *